United States Patent
Rishovd

[11] 3,789,901
[45] Feb. 5, 1974

[54] METHOD AND APPARATUS FOR INFLATING TUBELESS TIRES AND THE LIKE

[75] Inventor: Sigurd A. Rishovd, Minneapolis, Minn.

[73] Assignee: Royal Industries, Inc., Osseo, Minn.

[22] Filed: Jan. 31, 1972

[21] Appl. No.: 222,167

[52] U.S. Cl............................. 157/1.1, 144/288 A
[51] Int. Cl............................................ B60c 25/12
[58] Field of Search.. 157/1.1, 1.2, 1.22, 1.24, 1.26, 157/1.28, 1.3; 73/483, 484, 485, 487; 211/23, 24

[56] References Cited
UNITED STATES PATENTS

| | | | |
|---|---|---|---|
| 3,675,705 | 7/1972 | Corless | 157/1.1 |
| 3,522,832 | 8/1970 | Held | 157/1.22 |
| 3,013,601 | 12/1961 | Hildre | 157/1.2 |
| 3,280,640 | 10/1966 | Fuertges | 73/484 |
| 3,683,991 | 8/1972 | Ruhland | 157/1.1 |

Primary Examiner—Granville Y. Custer, Jr.
Assistant Examiner—Harold P. Smith, Jr.
Attorney, Agent, or Firm—Carlsen, Carlsen & Sturm

[57] ABSTRACT

Apparatus for inflating a tubeless tire on the wheel of a vehicle which is operable for tires and wheels of different sizes. A work surface, with a circular aperture dimensioned to removably accept a wheel of the largest diameter to be used, is provided with a plurality of annularly spaced, upwardly, inwardly directed sources of air under pressure. A plurality of support members of adjustable height are disposed radially outwardly of the sources of air. A wheel and deflated tire are then disposed over the inflating apparatus with the bottom side wall of the tire engaging the top of the apparatus radially outwardly of the sources of air and the top bead of the tire supporting the upper rim of the wheel. The height of the wheel and tire above the plane of the sources of air is determined by the size of the wheel. Once the tire and wheel are disposed in proper position, a substantial quantity of air under pressure is emitted from the sources of air and supplied to the normal valve on the wheel and the tire is seated and inflated almost instantaneously.

8 Claims, 7 Drawing Figures

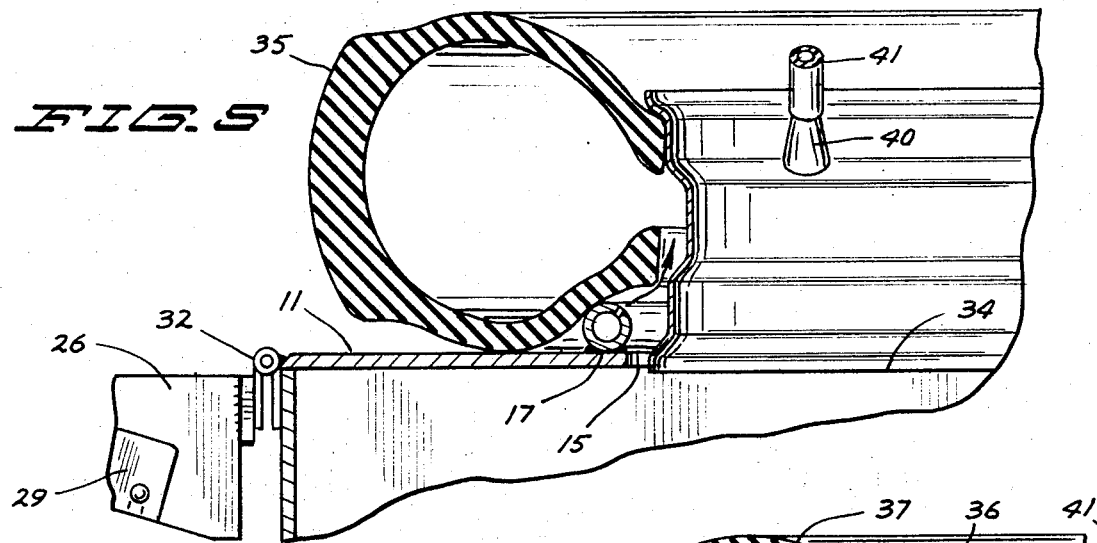
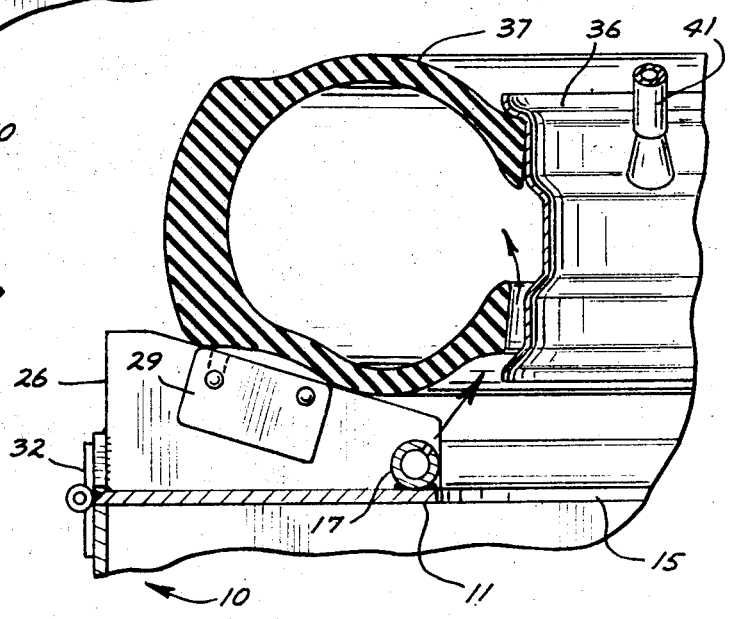
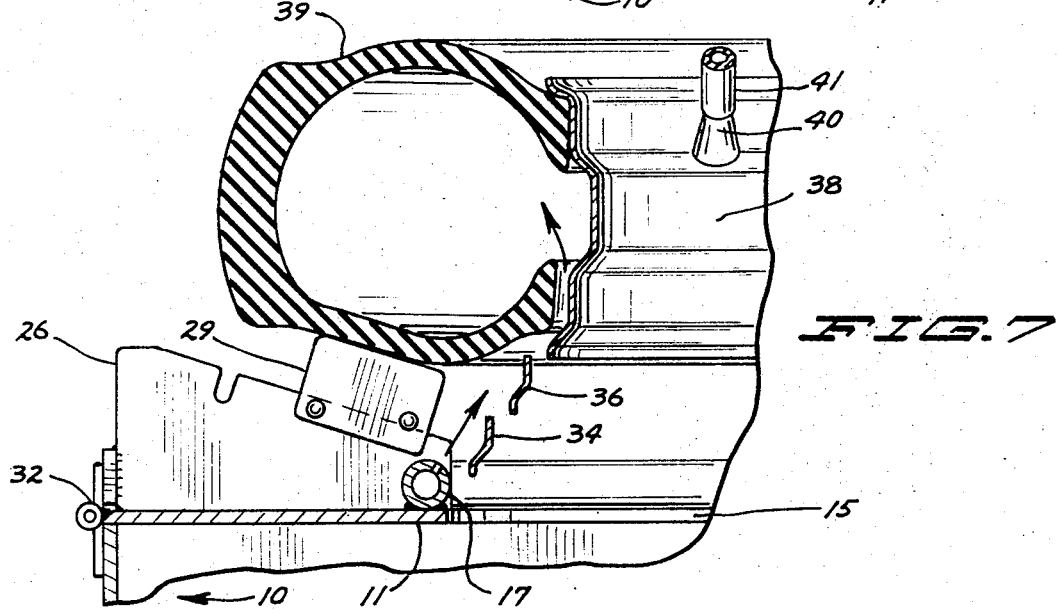

METHOD AND APPARATUS FOR INFLATING TUBELESS TIRES AND THE LIKE

BACKGROUND OF THE INVENTION

This invention is concerned with an improvement in inflation apparatus of the general type illustrated and claimed in the Corless U.S. Pat. No. 3,552,469. In the Corless patent, a toroid is provided with an annular orifice and air is injected through the top of a tubeless tire that is loosely disposed on the rims of a wheel.

In my copending application, Ser. No. 167,982, filed Aug. 2, 1971, for TIRE BEAD SEATER, an improved form of inflater is incorporated in a tire mounting and demounting device. In the tire mounting and demounting device, the wheel is stationarily disposed in a chucking or holding device using movable jaws to engage and hold the wheel. A plurality of sources of air may be disposed on the movable jaws to provide a source of air to be applied to the lower rim of a wheel about the same relative position because the jaws usually engage a wheel at about the same position.

In either of the above devices, it is sometimes necessary to manually urge one of the beads of a tire toward a sealing engagement with the rim of a wheel on the side opposite to the side that the air under pressure is injected into the space between the tire bead and wheel rim. As will be seen more clearly from a consideration of the detailed description set forth below, my invention utilizes a combination of elements which solve this, and other problems of efficiently inflating a tire on a wheel.

SUMMARY OF THE INVENTION

It is an object of my invention to provide an improved tubeless tire inflating apparatus. This may be provided by utilizing a stationary plurality of sources of air under pressure that are annularly spaced around the periphery of a circular aperture in a base, such as the top of a housing for a bubble type wheel balancer of the class which may include a centrally disposed, vertically reciprocable, automatic wheel centering and support member. The diameter of the aperture is slightly larger than the outside diameter of the largest wheel on which a tubeless tire is to be mounted and inflated. The sources of air are disposed to direct air upwardly and inwardly toward the vertical axis at the center of the aperture so that a substantially conical flow of air under pressure may be present when all of the sources of air are energized to emit compressed air.

When a deflated tire on a wheel is to be inflated, it is substantially centered upon the aperture. Since the tire is of much larger diameter than the aperture, the lower side walls of the tire will be supported by the base. The tire will then support the top rim of the wheel from the upper bead, and the bottom rim of the wheel will be suspended with a substantial space between it and the lower bead of the tire.

In order to accommodate wheels of lesser diameter, adjustable supports may be spaced annularly around the base so that the wheel and tire may be supported above the base at a height whereat the cone of air will enter the space between the lower bead of the tire and the bottom rim of the wheel.

It may therefore be seen that one object of my invention is to provide an improved operation in the automatic inflation of tubeless tires. Another object of my invention is to reduce the likelihood of injury to an operator in the event a tire becomes disengaged from the rim of a wheel when undergoing inflation, since the operator need no longer manually manipulate the tire to aid in effecting seating of the beads. A still further object of my invention is to reduce the complexity of apparatus capable of accommodating a wide variety of sizes and shapes of wheels and tires.

These and many other objects and advantages of my invention may become apparent from a full consideration of the appended illustrative embodiment of my invention.

DESCRIPTION OF THE DRAWINGS

In the appended drawing of a preferred illustrative embodiment of my invention;

FIGS. 5, 6 and 7 are enlarged fragmentary sectional views of a portion of my apparatus illustrating the relationship of the several elements under several conditions.

DESCRIPTION OF A PREFERRED EMBODIMENT

Figure 1:
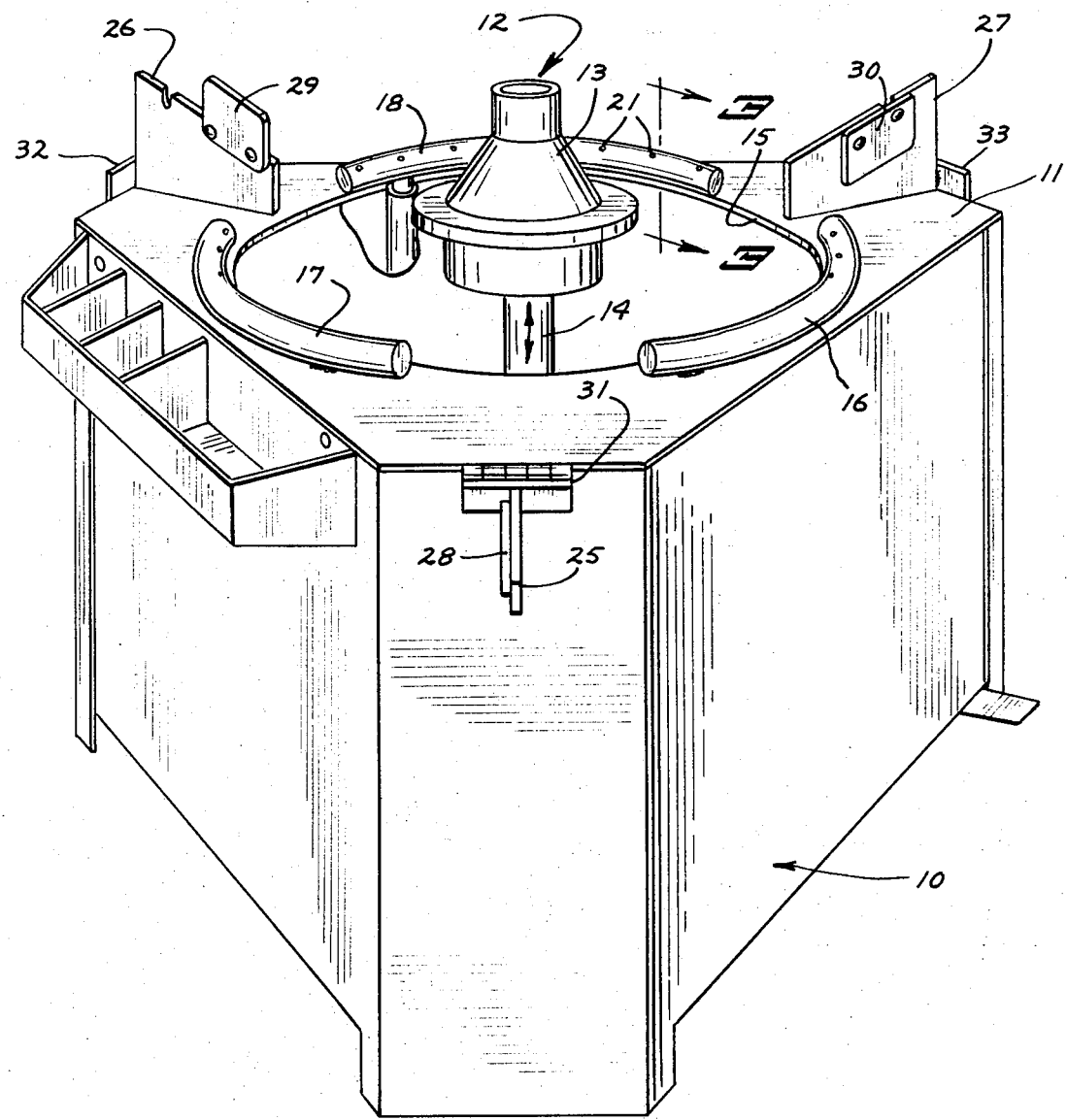
FIG. 1 is a three-fourth top perspective view of a combined tire inflater and wheel balancing apparatus.

Referring now to the drawings, my invention is shown incorporated into a stand, or housing, 10, that is of generally triangular configuration and includes a generally horizontally disposed top base 11 having a circular aperture 15 surrounding a centrally located substantially vertical axis.

A wheel balancing unit including a float cup and bubble 12, a downwardly extending, outwardly flaring centering cone 13 and a reciprocally operable support shaft 14 is disposed concentrically of aperture 15. The wheel balancing unit may be of the type presently manufactured by the assignee of this invention, known as an air float bubble balancer Model No. 570 manufactured by Bishman Division, Royal Industries, Inc., of Osseo, Minnesota. The wheel balancing unit is preferably constructed and arranged (not shown) so that it may be completely retracted into stand 10 whereby it will not extend above top base 11 and interfere with a wheel and tire during an inflation procedure except as may be necessary to aid in centering a wheel and tire to be inflated over aperture 15.

Figure 3:
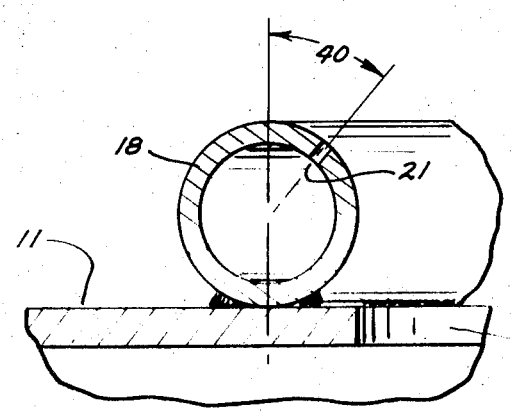
FIG. 3 is an enlarged fragmentary sectional view of a portion of my invention taken along section line 3—3 in FIG. 1.
Figure 2:
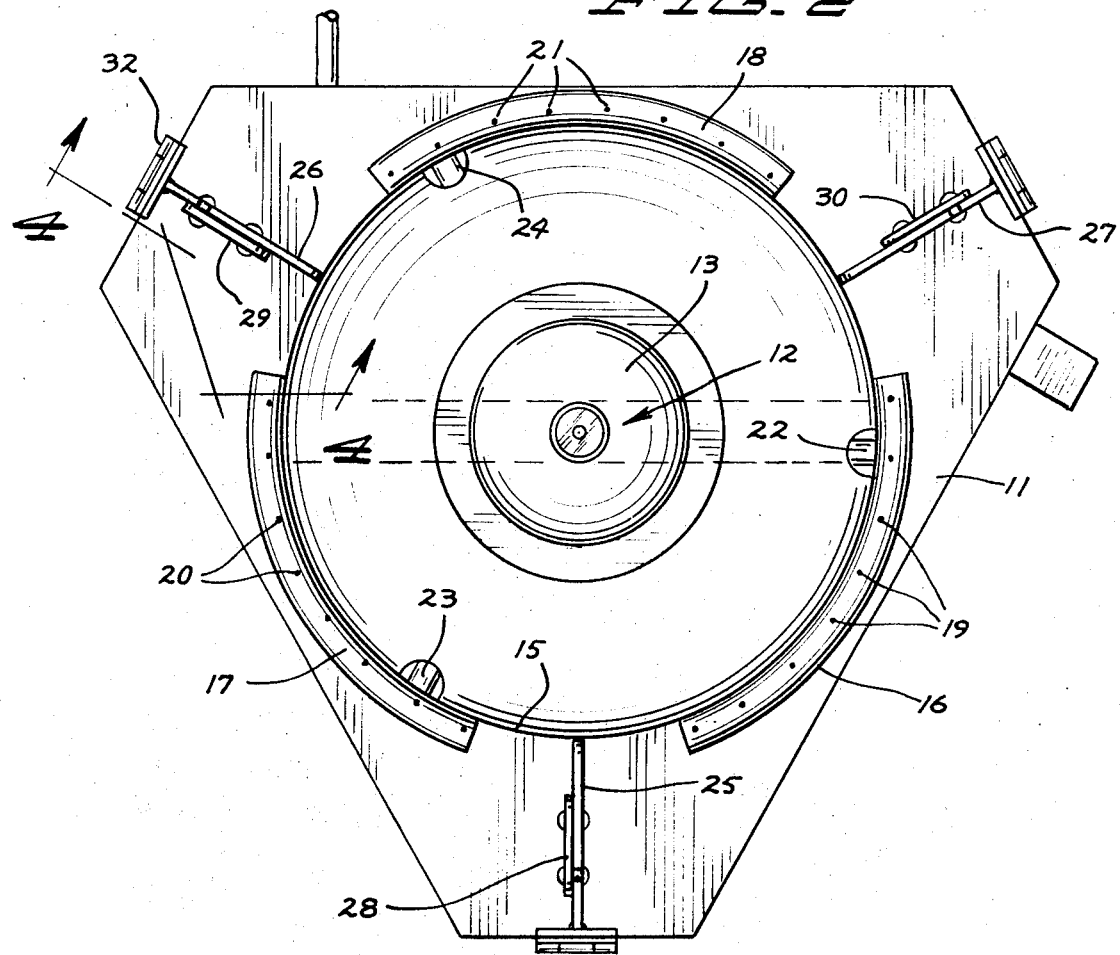
FIG. 2 is a top plan view of the apparatus shown in FIG. 1.
Figure 4:
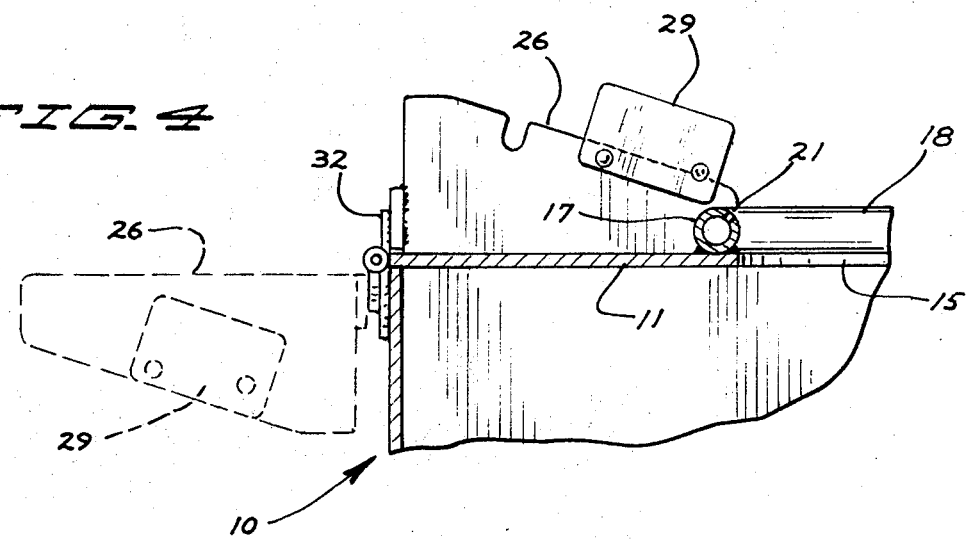
FIG. 4 is an enlarged fragmentary sectional view of a portion of my invention taken along section line 4—4 in FIG. 2.

A plurality of annularly extending, arcuately shaped manifold segments 16, 17 and 18 are disposed around the periphery of aperture 15 in top base 11. Each of the segments includes a plurality of orifices 19, 20 and 21, respectively, from which air under pressure may be emitted, and inlet tubes 22, 23 and 24, respectively, which are utilized to connect each of the segments to a suitable source of compressed air (not shown). Orifices 19, 20 and 21 may preferably be disposed at an angle of 40 degrees from a vertical axis as shown in FIG. 3 of the drawings on segment 18.

A plurality of ramp members 25, 26, 27, each having an upwardly opening notch, extend vertically upwardly of top base 11 at the three corners. Each of the ramp members is hinged to the top side of stand 10 by hinge elements 31, 32 and 33, respectively. Further ramp spacers 28, 29 and 30, having laterally extending pins, are rotatably disposed on the top portions of ramp members 25, 26 and 27, respectively.

Referring specifically to FIGS. 5, 6 and 7 of the drawings, wheels 34, 36 and 38 are shown having uninflated tires 35, 37 and 39 disposed thereon. Wheels 34, 36 and 38 each have a valve member 40 that is to be connected to a suitable source of air under pressure (not shown) during an inflation procedure. Wheel 34 might be, for example, a 17 inch wheel, wheel 36 a 15 inch wheel, and wheel 38 a 13 inch wheel.

OPERATION

When a tire is to be inflated, the wheel and tire are placed upon the top of the apparatus substantially coaxial of aperture 15. Considering the largest size of wheel that may be accommodated in aperture 15, the relationship of FIG. 5 shows that ramps 25, 26 and 27 are folded back upon hinges 31, 32 and 33 so as to allow tires 35 to rest upon top base 11. The lower bead of tire 35 and bottom rim of wheel 34 are disposed adjacently above orifices 19, 20 and 21 in segments 16, 17 and 18. The top rim of wheel 34 is supported on the upper bead of tire 35. (While the upper bead of tires 35, 37 and 39 is shown in a seated attitude, it may be understood by those skilled in the art that only the start of the seating of the top beads will suffice, in many cases, to support the wheel while still maintaining an effective seal to prevent the loss of air.)

After the wheel and tire have assumed the general positional relationship shown in FIG. 5, an operator connects tube 41 and tubes 22, 23 and 24 to a source of air under pressure, and the tire is rapidly expanded to a point whereat the lower bead of tire 35 starts to engage the rim of wheel 34. At this time the air supplied to segments 16, 17 and 18 may be disconnected and air supplied to tube 41 and valve 40 will complete the filling of the tire to fully seat each of its beads with the rims of the wheel.

FIGS. 6 and 7 show the positional relationship and the general direction of the flow of air under pressure for smaller wheels and tires. In FIG. 6, an intermediate size is shown as being initially supported by the tops of ramp members 25, 26 and 27. The air from segments 16, 17 and 18 is emitted in a generally fragmented conical shape, and the gap or space between the bottom wheel rim and lower bead seat is disposed to lie with the cone of air under pressure.

Similarly, FIG. 7 shows the relationship for a still smaller wheel and tire. In FIG. 7 the tire is disposed on top of ramp spacers 28, 29 and 30 which have been rotated so as to lie on top of ramp members 25, 26 and 27 and thereby support tire 39 and wheel 38 so that the gap between the lower bead of tire 39 and the bottom rim of wheel 38 lies within the cone shaped sections emitted from orifices 19, 20 and 21.

It may thus be seen that I have provided apparatus and a method for inflating a tubeless tire on a wheel which includes generally conical shaped sections of air that is emitted from a plurality of annularly spaced sources or orifices and a wheel and tire to be inflated are adjustably mounted thereover at a predetermined distance so that maximum efficiency may be obtained in the use of the air to both support and inflate the tire to effect a rapid seating of the beads so as to allow complete inflation.

Having now therefore fully illustrated and described my invention, what I claim to be new and desire to protect by Letters Patent is:

1. Apparatus for inflating a tubeless tire on a wheel; a plurality of sources of conical sections of air under pressure about an axis; means for connecting said plurality of sources of air to a source of air under pressure; and means including a plurality of tire support members for adjustably disposing a wheel, having a tire to be inflated thereon, with the axis thereof coaxial with the axis of the conical sections of air and with a rim and tire bead within said conical sections of air.

2. The apparatus of claim 1 in which the sources of air are disposed on a planar base and the tire support members are hingedly mounted thereon.

3. The apparatus of claim 2 in which the members include height increasing means rotatably disposed thereon.

4. The apparatus of claim 1 in which the plurality of sources of air are disposed in a substantially horizontal plane and the vertex of the conical sections of air is disposed above said plane.

5. The apparatus of claim 4 in which the means for adjustably disposing the wheel and tire is in engagement with the lower side wall of the tire.

6. The apparatus of claim 1 in which the sources of air under pressure are disposed around an aperture in a base, said aperture being large enough to accommodate the rim of a wheel.

7. The apparatus of claim 6 in which a conical member is reciprocably disposed on the axis of the aperture in the base whereby the center opening in a wheel may be engaged to center a wheel on the apparatus prior to inflation of the tire on the wheel.

8. The apparatus of claim 7 in which the conical member is rotatably mounted whereby an inflated tire and wheel assembly may be statically balanced subsequent to inflation of said tire.

* * * * *